INVENTORS
EDWIN P. MEINERS
GLENN A. SCHURMAN

United States Patent Office 2,923,366
Patented Feb. 2, 1960

2,923,366

SEISMIC PROSPECTING METHOD

Edwin P. Meiners and Glenn A. Schurman, Whittier, Calif., assignors to California Research Corporation, San Francisco, Calif., a corporation of Delaware Application March 7, 1952, Serial No. 275,452

1 Claim. (Cl. 181—.5)

This invention relates to a method of seismic prospecting or exploration and particularly refers to the steps of and means for producing a seismic impulse over an extended area beneath the surface of the earth and substantially parallel thereto, and to the control of the character, frequency and intensity of the impulse which is imparted to the desired area and is subsequently reflected from subsurface formations and detected by any suitable means or methods known to this art.

Heretofore, it has been the practice to generate seismic impulses in the earth at desired points therein, thereon, or above its surface by the detonation of one or more explosive charges. To be effective when placed at a single point below the earth's surface, the amount of energy dissipated in the shot hole, or cavity in which the shot was fired, was so high that the surrounding earth was shattered, displaced, compacted or otherwise modified in character or properties so that subsequent shots could not reproduce the desired seismic impulse. Also, the distribution of the energy as to its wave form, frequency, duration, and the like was completely uncontrolled, and varied greatly with the nature of the soil or rock in which the explosive was detonated, as well as other unknown and unpredictable factors.

This invention comprehends broadly the placing of a plurality of electro-mechanical transducers in a desired geometrical pattern or array slightly below the surface of the ground and coupled thereto by a suitable couplant such as oil, water, or a water-clay mud mixture. The transducers are pulsed simultaneously from a single controllable electric power supply and form a single extended source of seismic disturbance at an intensity which will not disturb or affect adversely the couplant or the soil, sand, rock or the like in contact with the transducers. Reflections of said disturbance from underground or subsurface strata are detetced either by the same transducer array or by other types of seismic detectors spaced therefrom in any desired manner, and are recorded by suitable equipment.

It is an object of this invention to provide an improved method of imparting a seismic impulse to a selected area of the earth, as distinguished from a selected point therein, desirably as a predetermined depth below the surface, by placing therein a group or array of electro mechanical piezoelectric transducers each actuated simultaneously or in a predetermined sequence by a controlled electrical impulse of predetermined frequency and duration.

Another object is to provide an improved method of producing a low intensity seismic impulse at a number of predetermined spaced points within a given area of the earth's surface, the combined effect of such low intensity impulses being adequate to give usable reflections from subsurface formation, but the individual effect being of such small magnitude that the earth immediately surrounding each point is not permanently altered. Thus the earth is not disturbed to a degree which will prevent an indefinitely large number of repeated impulses of controlled character to be imparted to said area to obtain identical reflections from the subsurface strata.

These and other objects and advantages will be further apparent from the following description and appended drawing illustrating a preferred method and means for carrying out this invention.

Figure 1:
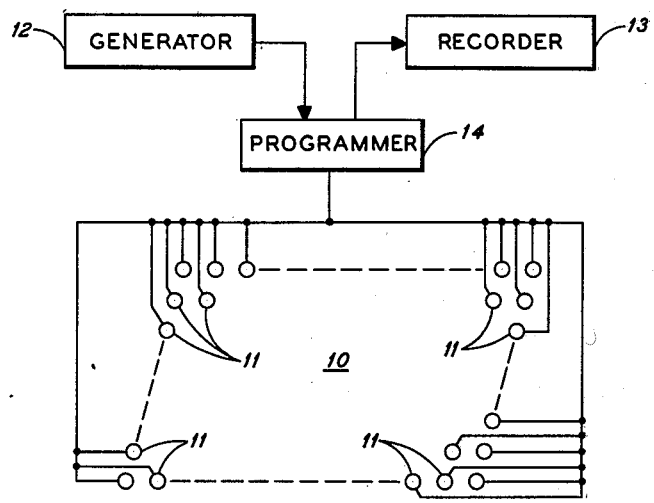
Fig. 1 is a schematic illustration in plan perspective of a seismic array with associated circuitry.
Figure 2:
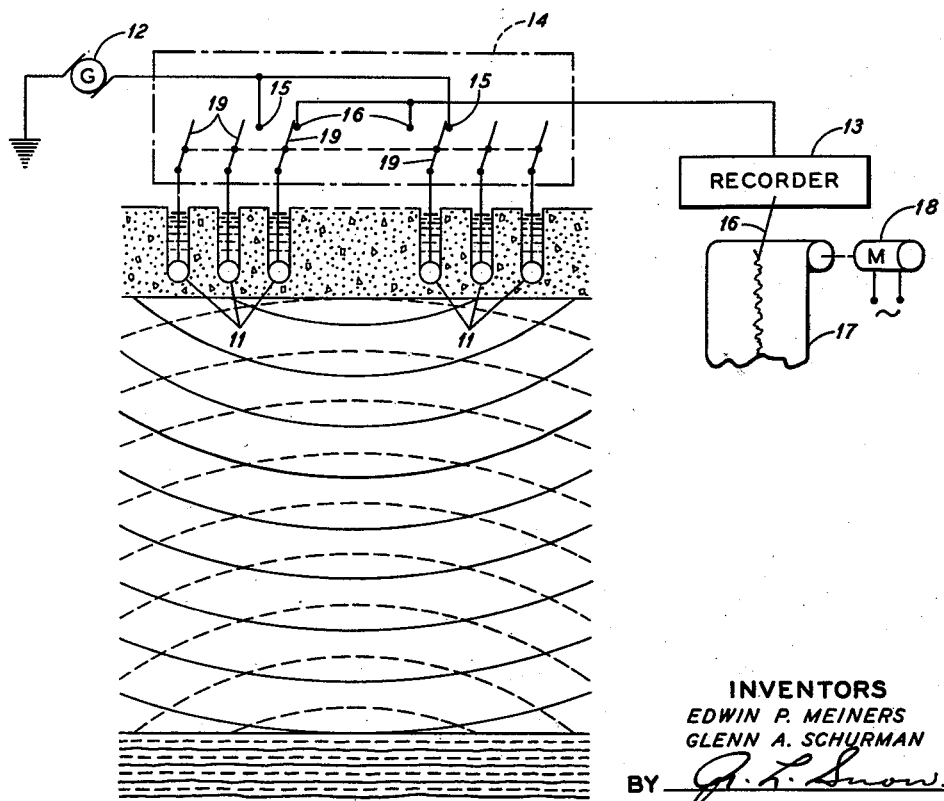
Fig. 2 is a schematic illustration of one form of transducer interconnection for the performance of the present method.

In the figures an array 10 of individual piezo-electric transducers 11 is illustrated as connected to a generator 12 and recorder 13 through a programmer 14. The generator 12 may be of conventional design to provide electrical impulses of controlled current to selectable contacts 15 of the programmer 14 for the energization of the individual transducers 11 within the array. The recorder 13 is selectably connectable to contacts 16 of programmer 14 and may also be of conventional design including a stylus 16 for recording seismic reflection signals on a tape or reproducible recording 17 driven by motor 18. The programmer 14 includes ganged movable contacts 19 to which the individual transducers 11 are connected and is operable to terminate the energization of the transducers as seismic disturbance generators and to connect selected transducers as seismic detectors. It should be understood that the programmer is simplified in the schematic illustration and that it includes switching mechanism for connecting selected transducers as seismic generators, as detectors, or as sequentially generators and then detectors in various programs in this method of seismic surveying.

The individual electro-mechanical transducers 11 forming the proposed array 10 may be of any desired character, but preferably are of substantially regular geometrical configuration of about 4 to 30 inches in diameter, or are vertically placed cylinders 4 to 6 inches in diameter and 4 to 6 feet long. If these are piezoelectric, they may be formed of suitable ceramic material, for example barium titanate. This material may be molded or formed exactly to the desired shape or may be obtained as thin flat plates which may be ground to shape and cemented along their edges to form regular shapes, for example faceted spheres, such as pentagonal dodecahedrons, or may be cemented edge to edge to form generally cylindrical bodies. The electrodes on the opposed faces are suitably connected to give the desired mechanical response to the applied electrical impulse, as will be discussed below.

The individual transducers may be uniformly spaced in an array having a diameter of about one to one-hundred wavelengths of the impulse frequency employed, and desirably ranging from about three to ten wavelengths, each transducer being preferably, although not necessarily, less than about one-half wave length from the next in a horizontal direction. The transducer array depth is desirably such that the seismic waves reflected back from the ground surface arrive at the transducer array with such phase as to reinforce the primary waves emitted in the desired direction, generally downwardly, from that array.

The electrical impulse from the generator 12 is suitably controlled to impart to the transducer electrodes a high voltage alternating current pulse having a frequency in the range of approximately 20 to 5000 cycles per second, and a duration of from about 0.001 to 0.1 second. These factors are in large part dependent upon the sound transmission characteristics of the earth formations through which the seismic impulses are to be transmitted and reflected, and will be apparent with a minimum of experimentation to one skilled in this art.

Piezoelectric transducers of this type are equally well adapted to receive seismic impulses as to generate them, so that the generator 12, after energizing the transducers, may be disconnected therefrom, and a suitable recorder 13 of electrical signals connected thereto, to indicate or record reflections from subsurface strata. Alternatively, one or more groups of suitable detectors for the seismic reflections may be spaced from the impulse area, to receive and record the reflections from the subsurface formations. Although a single example has been given of a type of transducer and an arrangement therefore to carry out this method, it is apparent that many variations could be made without departing from this invention, which is considered to reside in a method of imparting to a desired area, as distinguished from a single point in the earth, and below the surface thereof, a controlled wave length of frequency and duration of seismic disturbance or impulse and receiving reflections of that impulse from subsurface formations. Accordingly, all such variations and changes as come within the scope of the appended claim are intended to be embraced thereby.

We claim:

A method of seismic surveying comprising the steps of drilling a plurality of holes into the ground, placing at least one piezoelectric transducer within each of said holes, coupling said transducers with said ground, selectively connecting at least certain of said transducers as a source of seismic disturbance, impressing an alternating current signal of a predetermined frequency and duration to said transducers to generate an elastic seismic disturbance without altering the structure of said ground, terminating said alternating current signal, selectively connecting at least certain of said transducers as receivers of reflections of said seismic disturbance, said receivers selectively including said transducers previously connected as said source, and repeating said selective connection of transducers as source and receiver to create and receive additional reflections of seismic disturbances.

References Cited in the file of this patent

UNITED STATES PATENTS

| | | |
|---|---|---|
| 1,240,328 | Fessenden | Sept. 18, 1917 |
| 2,044,807 | Noyes | June 23, 1936 |
| 2,281,751 | Cloud | May 5, 1942 |
| 2,364,209 | Green | Dec. 5, 1944 |
| 2,405,187 | Benioff | Aug. 6, 1946 |
| 2,425,868 | Dillon | Aug. 19, 1947 |
| 2,451,967 | Massa | Oct. 19, 1948 |
| 2,530,971 | Kean | Nov. 21, 1950 |
| 2,630,188 | Hawkins et al. | Mar. 3, 1953 |
| 2,642,146 | Woods | June 16, 1953 |
| 2,654,874 | Press | Oct. 6, 1953 |
| 2,704,364 | Summers | Mar. 15, 1955 |
| 2,718,928 | Weiss | Sept. 27, 1955 |
| 2,722,282 | McDonald | Nov. 1, 1955 |
| 2,745,507 | Bodine | May 15, 1956 |
| 2,755,879 | Widess | July 24, 1956 |

FOREIGN PATENTS

| | | |
|---|---|---|
| 701,747 | France | Jan. 13, 1931 |